(12) United States Patent
Delaporte

(10) Patent No.: US 7,038,410 B2
(45) Date of Patent: May 2, 2006

(54) ELECTRIC MOTOR WITH DYNAMIC DAMPING

(75) Inventor: Dany Paul Delaporte, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 162 days.

(21) Appl. No.: 10/328,245

(22) Filed: Dec. 23, 2002

(65) Prior Publication Data

US 2004/0118638 A1  Jun. 24, 2004

(51) Int. Cl.
 *H02P 7/29* (2006.01)

(52) U.S. Cl. .................... 318/293; 318/268; 318/269; 318/379

(58) Field of Classification Search ............... 318/375, 318/379, 380, 466–470, 280–286, 291, 293, 318/268, 269, 272
See application file for complete search history.

(56) References Cited

U.S. PATENT DOCUMENTS

| | | | |
|---|---|---|---|
| 3,403,316 A * | 9/1968 | Conant, Jr. ................ 318/436 |
| 3,525,883 A * | 8/1970 | Demetre ..................... 327/423 |
| 3,851,233 A | 11/1974 | Sherman |
| 3,911,342 A | 10/1975 | Herwig |
| 4,011,492 A | 3/1977 | Murphy et al. |
| 4,319,171 A * | 3/1982 | Motoori ....................... 318/379 |
| 4,423,363 A | 12/1983 | Clark et al. |
| 4,477,751 A * | 10/1984 | Kanayama ................... 318/280 |
| 4,514,666 A * | 4/1985 | Suzuki ......................... 318/293 |
| 4,527,103 A * | 7/1985 | Kade ............................ 318/293 |
| 4,544,869 A * | 10/1985 | Pittaway ...................... 318/293 |
| 4,581,565 A * | 4/1986 | Van Pelt et al. ............ 318/294 |
| 5,428,522 A * | 6/1995 | Millner et al. ................ 363/63 |
| 5,486,747 A | 1/1996 | Welch |
| 5,744,922 A * | 4/1998 | Neary et al. ................. 318/293 |
| 5,892,340 A * | 4/1999 | Sasajima et al. ............ 318/293 |
| 5,894,204 A | 4/1999 | Kumita |
| 5,933,573 A | 8/1999 | Lukenich et al. |
| 5,969,303 A | 10/1999 | Piserchia et al. |
| 6,043,996 A | 3/2000 | Kumar |
| 6,118,241 A | 9/2000 | Kazlauskas |
| 6,122,579 A | 9/2000 | Collier-Hallman et al. |
| 6,160,368 A | 12/2000 | Plutowski |
| 6,175,204 B1 | 1/2001 | Calamatas |
| 6,198,241 B1 | 3/2001 | Calamatas |
| 6,588,541 B1 | 7/2003 | Norman et al. |

FOREIGN PATENT DOCUMENTS

EP   94307315.5   4/1995

* cited by examiner

*Primary Examiner*—Bentsu Ro
(74) *Attorney, Agent, or Firm*—Scott A. McBain

(57) ABSTRACT

A method of dynamically damping an electric motor (12) that is controlled by an H-bridge driver (16) by interdigitating power pulses with braking pulses by switching from a power switch mode to a shorting circuit mode with switches (22 and 26) closed that brakes the electric motor.

7 Claims, 6 Drawing Sheets

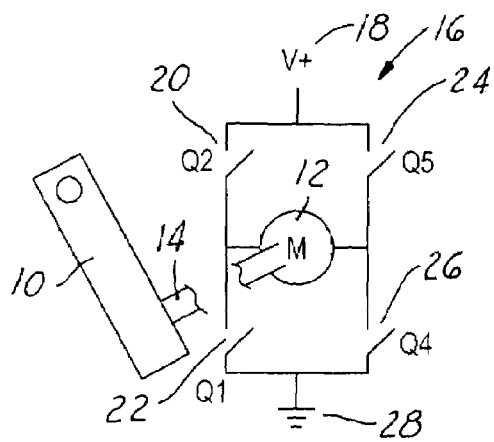
FIG. 1
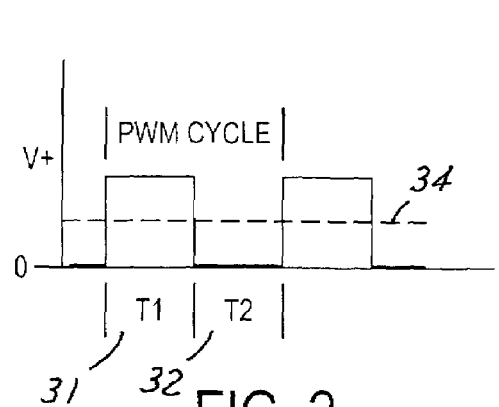
FIG. 2
|  | SWITCH STATE | | | | MOTOR MOTION |
|---|---|---|---|---|---|
|  | Q2 | Q1 | Q5 | Q4 |  |
| T1 | ON | OFF | OFF | ON | CW (Forward) |
| T2 | OFF | OFF | OFF | OFF | Coast (Open) |
| T1 | OFF | ON | ON | OFF | CCW (Reverse) |
| T2 | OFF | OFF | OFF | OFF | Coast (Open) |
(Prior Art) FIG. 3
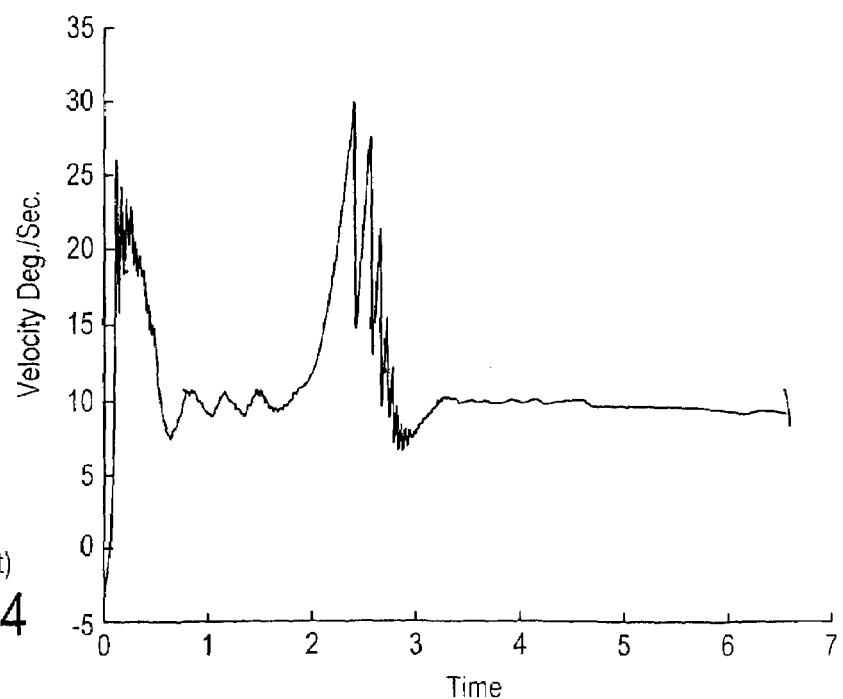
(Prior Art) FIG. 4

|  | | SWITCH STATE | | | | MOTOR MOTION |
|---|---|---|---|---|---|---|
|  | | Q2 | Q1 | Q5 | Q4 |  |
|  | T1 | ON | OFF | OFF | ON | CW (Forward) |
|  | T2 | OFF | ON | OFF | ON | Brake |
| FIG. 6 OR | T1 | OFF | ON | ON | OFF | CCW (Reverse) |
|  | T2 | OFF | ON | OFF | ON | Brake |

ELECTRIC MOTOR WITH DYNAMIC DAMPING

TECHNICAL FIELD

The field of this invention relates to an electric motor having a dynamic damping system suitable for vehicular power lift gates and power sliding doors.

BACKGROUND OF THE INVENTION

Power lift gates and power doors are popular on automotive vehicles such as mini-vans, station wagons, and SUVs. Many of these power lift gates and doors are powered by a DC electric motor placed in an H-bridge driver to supply the electric motor with pulsed power which may be modulated to control the speed of the motor. This controlled pulsing of the power is commonly referred to a pulse width modulation (PWM) and can be applied to power the motor in either the forward or reverse direction through the H-bridge driver.

The PWM control of the DC motor controls the speed of the motor by modulating the length of the individual pulses of power sent to the motor to derive an average power. For automotive application, the PWM frequency is confined to the low frequency spectrum from about 50 HZ to only a few hundred HZ to reduce any high frequency electromagnetic interference. The PWM cycle is divided into two portions, one portion is the power pulse period which powers the motor and the second portion is an open circuit when no power is applied. The average power is controlled by varying the length of the power pulse and the duration of the open circuit. For example, by lengthening the power pulse portion and decreasing the time of the open circuit portion increases the average power delivered to the motor.

The power pulse has a long enough duration for the motor to respond. However, the mechanical system such as the liftgate and motor will also respond during the duration of the second portion when the power is off. Thus in a lift gate for example, the liftgate angular velocity will slow down and may even reverse drive the motor due to the influence of gravity on the lift gate during the time of the open circuit. Thus one solution is to utilize a non-reverse drivable gear motor, such as a worm gear coupling which acts as a mechanical breaking device that prevents the gate from falling in between pulses of power. However, such coupling also prevents manual override of such lift gates and power doors and does not allow a person to manually speed up the motion if so desired.

The present systems also do not slow down the motor if it is running too fast thus not providing full motor speed control.

Alternative systems with overriding clutches and reverse drivable motor allow for the manual override but do not provide for a braking feature.

Dynamic braking systems are also known which provide pulsed braking power to the electric motor. Such dynamic braking systems cycles also are similarly divided into two portions, an open portion where no braking is applied and a short circuit portion where braking occurs. The pulses vary between an open circuit and a short circuit which controls the desired dynamic braking effect. The average braking power is controlled by varying the duration of the braking or short circuit and the duration of the open circuit. The pulsing between open and braking pulses thus dynamically control the amount of braking in such motors in much the same way as the PWM cycle during the powering of the motor. Lengthening the time of the short circuit portion and shortening the time of the open portion increases the dynamic braking of the motor. Dynamic braking is often applied during the closing cycle of the lift gate or during the period of time when the gas struts take over during the opening cycle of a lift gate.

What is needed is a dynamic damping system which cycles between power pulses and braking pulses for more desirable control of an electric motor for a power sliding door or power lift gate.

SUMMARY OF THE INVENTION

In accordance with one aspect of the invention, a method of dynamically damping a running electric motor includes interdigitating single pulses of power to run the motor with single braking pulses by repeatedly switching an H-bridge driver to alternately provide a power circuit through said motor and a shorting circuit that includes the electric motor. The length of the single pulses of power and the single braking pulses are preferably controlled for dynamically controlling the damping of the motor.

Preferably, the electric motor is driven by an H-bridge driver having four switches connected to the motor wherein the closure of a first high switch and a third low switch power the motor in a forward direction. The closure of a second high switch and fourth low switch power the motor in a reverse direction. The closure of the third low and fourth low switch provide a shorting circuit for the motor that produces a braking current.

The switches may be transistors, preferably field effect transistors (FETs) and a delay device such as a microprocessor with appropriate software provides a delay between the opening of one high switch that determines the end of a power pulse and the closing of a low switch that determines the commencement of the next respective braking pulse. In this fashion, a low and high switch on the same leg of the H-bridge driver are never both closed at the same time.

In accordance with another aspect of the invention, a method is disclosed for controlling the motion of lift gate in an automotive vehicle by an electric motor that is driven by an H-bridge driver having four switches connected to the motor wherein the closure of a first high switch and a third low switch power the motor in a forward direction. The closure of a second high switch and fourth low switch power the motor in a reverse direction. The closure of the third low and fourth low switch provide a shorting circuit of the motor for producing a braking current. The method comprises interdigitating single pulses of power to run the motor in either the forward or reverse direction with single braking pulses formed by the shorting circuit formed by closure of the third and fourth low switches. The motor is controlled by the modulating the length of the single pulses of power and the single braking pulses for dynamically controlling the motor in either the forward direction to open the lift gate or in the reverse direction to close the lift gate.

An alternative shorting circuit may be formed by closure of the two Hi FETs rather than the two low In this fashion noticeably improved performance of an electric motor for a power sliding door and power lift gate is possible.

BRIEF DESCRIPTION OF THE DRAWINGS

The present invention will now be described, by way of example, with reference to the accompanying drawings, in which:

FIG. 1 is a schematic illustration of an electric motor in a typical H-bridge driver connected to a lift gate that forms part of the present invention;

FIG. 2 is a schematic view of a typical PWM cycle illustrating the power cycle and the non-power cycle;

FIG. 3 is a chart illustrating the typical logic action of the on or off positions of the various switches shown in FIG. 1 known in the prior art;

FIG. 4 is a chart illustrating the lift gate angular velocity profile using a conventional PWM drive scheme for an opening cycle;

FIG. 6 is a chart illustrating the logic action in accordance with one embodiment of the invention;

DESCRIPTION OF THE PREFERRED EMBODIMENT

Figure 5:
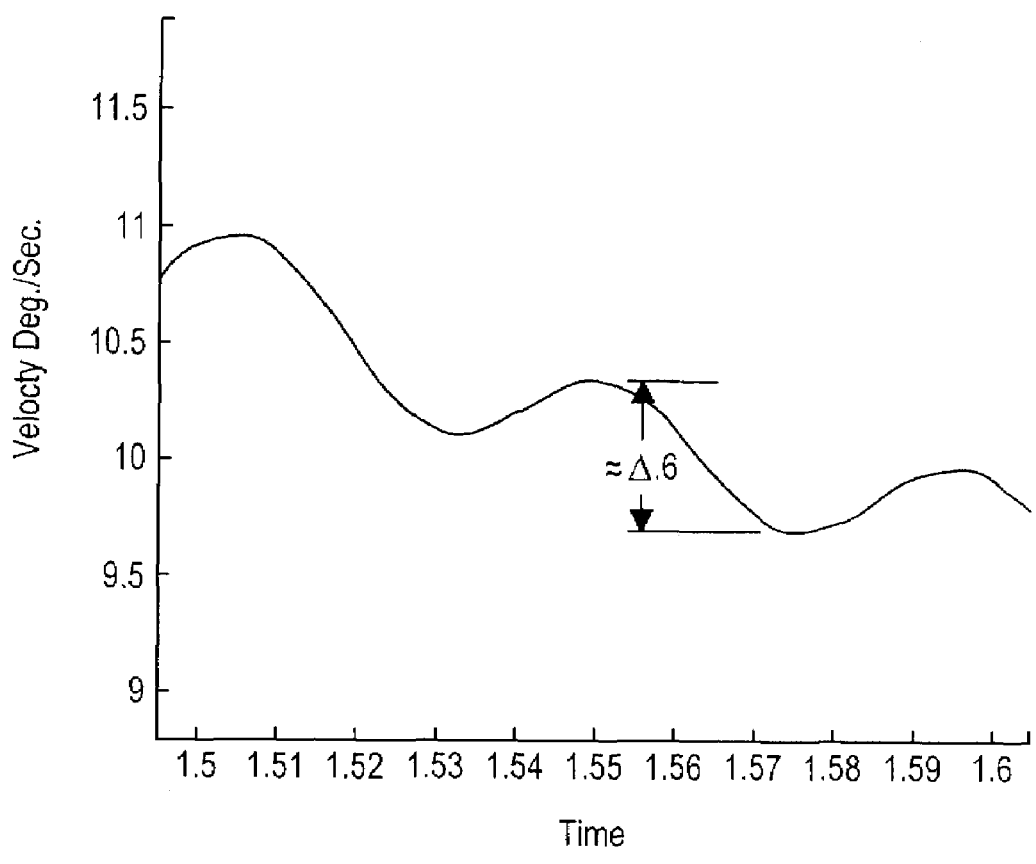
FIG. 5 is an enlarge detailed view taken during the time of 1.50–1.58 seconds more clearly illustrating the angular velocity ripple due to the PWM power cycles.

Referring now to FIG. 1, a power door such as a lift gate 10 is operably connected to a motor 12 through a drive shaft 14 or a cable. The motor 12 is driven through an H-bridge driver 16 for forward and reverse motion. The H-bridge driver is connected to a voltage source i.e. power supply 18 and through switches 20, 22,24 and 26 can be connected to ground 28. This H-bridge driver is well known to drive a power door through PWM controls. Switches 20,22, 24 and 26 may be in the form of FETs labeled Q1, Q2, Q4, and Q5.

The basic cycle of a PWM pulse is shown in FIG. 2 with a first portion 31 being the power portion for a given time T1 and a second portion 32 of duration T2 being an open circuit. The variation of the T1 and T2 portions leads to an average power output as shown by dashed line 34.

Conventional logic switching is shown in the chart disclosed in FIG. 3, where during the power pulse in the forward direction switches 20 and 26 are closed (i.e. on) and switches 22 and 24 are open (i.e. in the off position). The open cycle portion T2 has all the switches in the open (off) position. When the motor is going in the counterclockwise or reverse direction, the switches 22 and 24 are in the closed, i.e. on, position. The coast or T2 cycle in the reverse mode is the same as the T2 cycle in the forward mode with all switches 20-26 being in the open or off position.

The cycles portions 31 and 32 can have their respective times T1 and T2 modulated to vary the average power during the entire needed time cycle. For example, the use of a typical commercially known and sold system with an algorithm for controlling the pulses provide a velocity chart of a power lift gate as shown in FIG. 4. The lift gate undergoes an initial jerk with peak angular velocity of 25°/sec and then slowing down to a velocity of approximately 10°/sec with large velocity ripples of the order of 0.6°/sec. The velocity ripples of 0.6°/sec are shown in more detail in the graph shown in FIG. 5. The large increase between 2 and 3 seconds is due to backlash of the drive gear system and the mechanics of the gas struts forcing the lift gate along its upward course.

If on the other hand, instead of alternating the power pulse with an open circuit, a braking pulse is interposed between two sequential power pulses, a much smoother opening cycle occurs. Using substantially the same algorithm for varying the PWM as shown in use for the graphs shown in FIGS. 5 and 6, but instead of T2 being a coasting or open time where there is no completed circuit, the switches 24 and 26 are closed providing a short circuit or braking circuit during the time T2.

The logic of the switching is shown in FIG. 6. During the power portion of the cycle, switches 20 and 26 (Q2 and Q4) are on as with a conventional power portion. However, after the power portion is over and the T2 portion commences, instead of all switches being open, switch 20 (Q2) opens, switch 26 (Q4) remains closed and switch 22 (Q1) closes to provide a braking circuit through the motor 12.

During reverse direction of the motor, i.e. in the closing direction, switches 22 and 24 (Q1 and Q5) are closed as with conventional power cycle portions. However, after T1 and during T2, the switch 24 (Q5) opens and switch 22 (Q1) remains closed and switch 26 (Q4) closes to provide the same braking circuit through motor 12. The times of T1 and T2 may be modulated according to known algorithm to provide dynamic damping of the motor through alternating power cycle portions and braking cycle portions.

It is important that the switches 20 and 22 (Q2 and Q1) are not closed at the same time otherwise a dangerous short occurs. Similarly it is important that, during the reverse mode, switches 24 and 26 (Q5 and Q4) are not simultaneously closed.

Because the switches (Q1, Q2, Q4 and Q5) are FETs, there is a slight delay in each FET reacting to the on or off signal. For example, the Hi FETs Q2 and Q5 may have a reaction off time of approximately 30 μsec min to 140 μsec max. The turn on reaction time for each FET Q2 and Q5 ranges from 100 Usec min to 420 μsec maximum. On the other hand, low FETs Q1 and Q4 may have different and faster reaction times. The turn off time of Q1 and Q4 may be only 160 μsec max. The turn on time may range from 67 Usec to 106 μsec.

Figure 7:
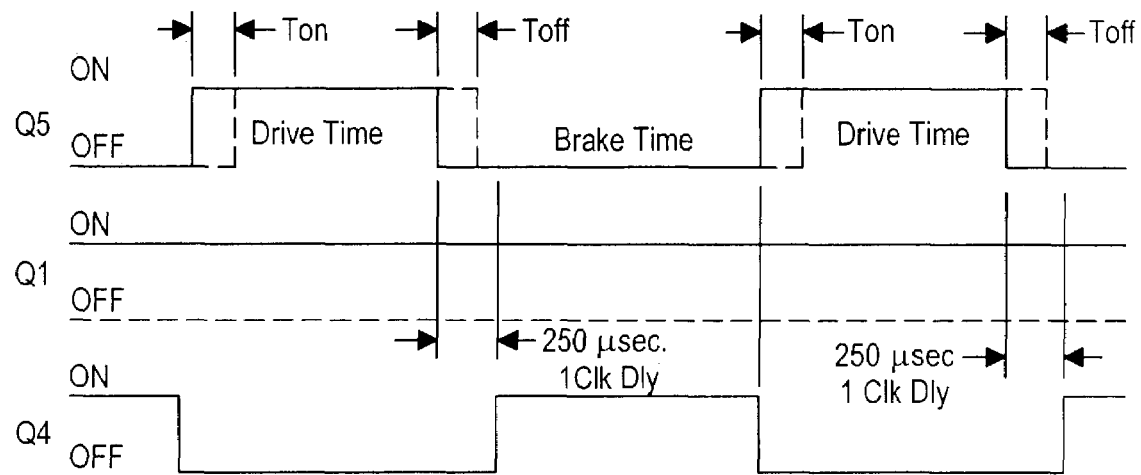
FIG. 7 is a chart illustrating the on and off switching times of the closing hi FET Q5, closing low FET Q1 and the closing brake FET Q4 during the closing cycle.

Because of the reaction times from single input to actual reaction of switching on or off, the timing of the signals must be adjusted to assure that the FETs such as Q1 and Q2 are not simultaneously on which would short the circuit. Similarly, the timing of actuations of the signals to Q4 and Q5 must be adjusted to assure that Q4 and Q5 are also not simultaneously on which would otherwise short the circuit. A chart that illustrates the closing cycle is shown in FIG. 7. The delay of the $T_{on}$ and $T_{off}$ times from the signal actuator and deactuator of the Q5 transistor after the actuation or deactuation signal is clearly shown. The delay of Q4 is insignificant and not shown. The relationship of Q2, Q1 and Q4 in the opening cycle is similar to that of the shown chart for the closing cycle.

Once the delays are built in such that the shorts are prevented, it has been found that the interdigitated single power pulses with single brake pulses provide better control of a power lift gate or power sliding door.

Figure 8:
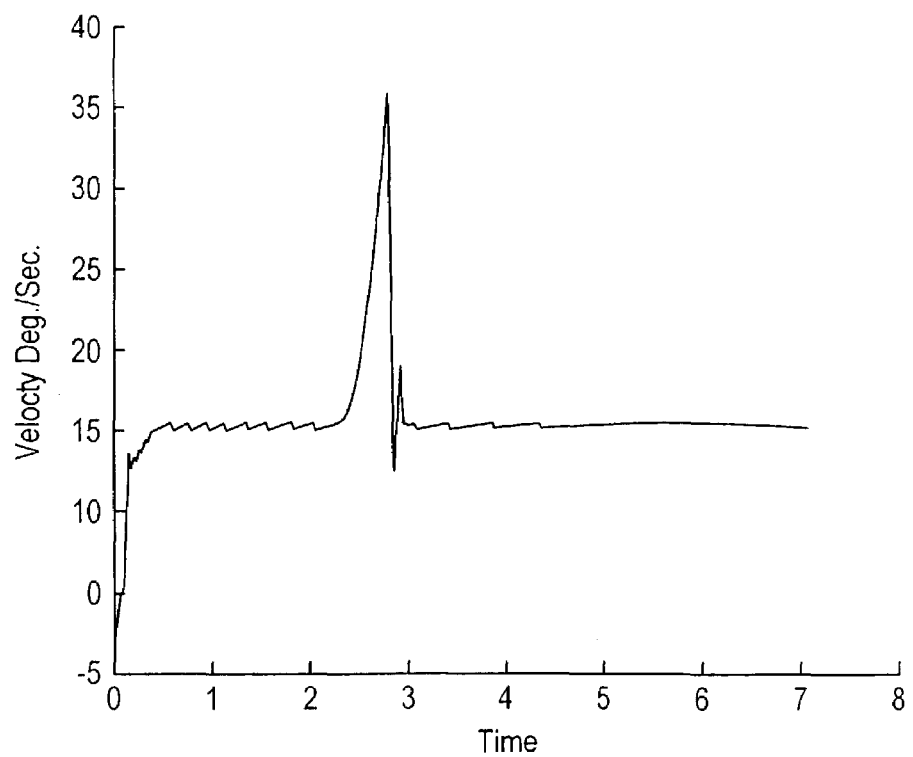
FIG. 8 is a view similar to FIG. 5 illustrating the angular velocity of the lift gate using the logic shown in FIG. 6.
Figure 9:
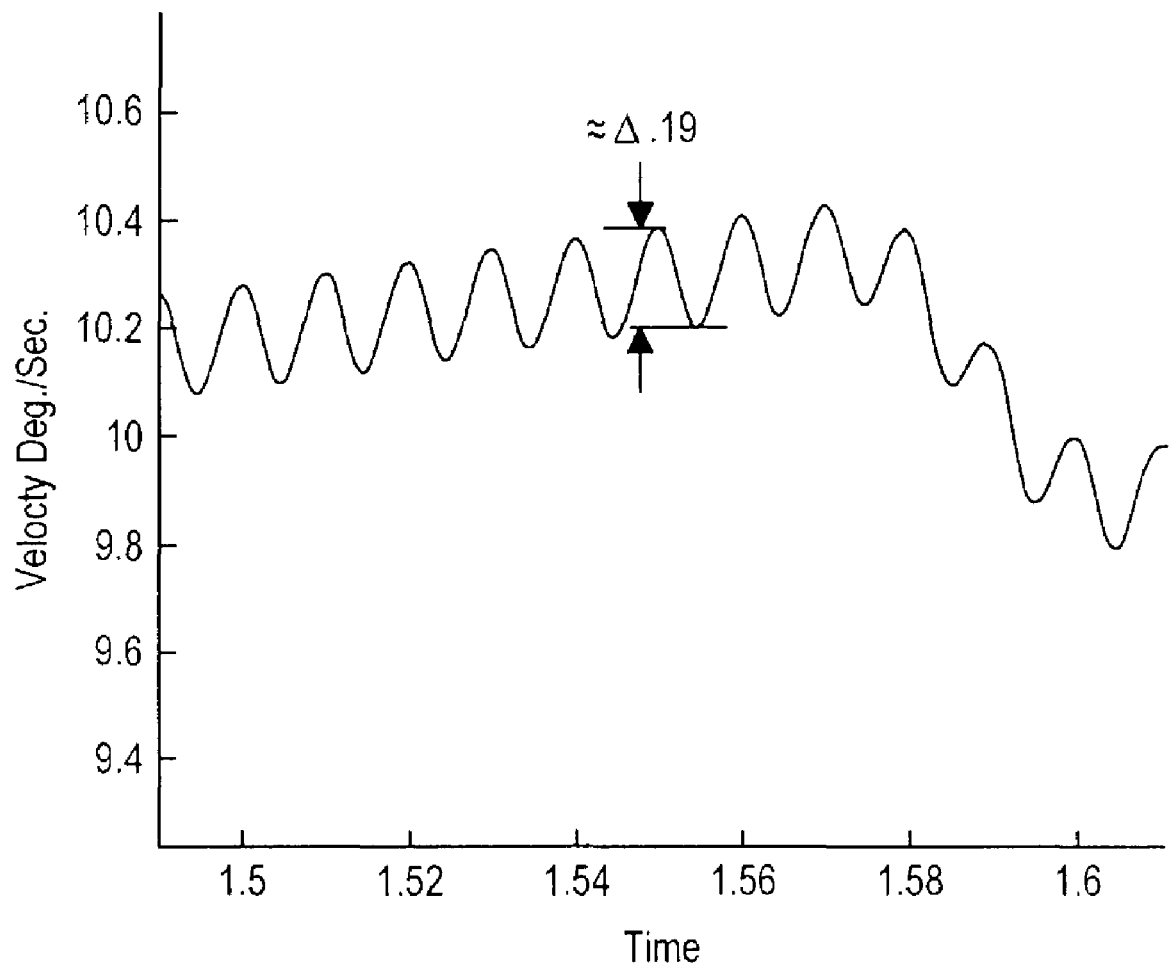
FIG. 9 is a view similar to FIG. 5 illustrating the decreased angular velocity ripple due to the interdigitating power and braking pulses.

The effect is shown in FIG. 8 which uses the same algorithm that produced the charts in FIGS. 4 and 5 only modified by replacing the coast phase with a brake phase, i.e. brake pulse. The graph illustrates a dramatic reduction of the initial velocity shock and the complete elimination of overshooting the target angular velocity of 10°/sec. Secondly, the velocity ripple is reduced to approximately 0.19°/sec as shown in detail in FIG. 9. The large increase in speed due to the operation of the gas struts still occurs between 2 and 3 seconds but the undershoot just near 3 seconds is also reduced.

The interposition of a single braking pulse between a single power pulse provides for dynamic damping which smoothes out the velocity contour and provides greater and smoother control of the lift gate opening cycle.

Similar advantages also occur during the closing cycle of the lift gate.

Because FETs (Q1, Q2, Q4 and Q5) are used as switches 20, 22, 24 and 26, controls are needed to take into account the delay of de-activation of a FET switch before the activation of another FET switch as illustrated in FIG. 7. Such delays can be built into software subroutines of known algorithms as shown in the flow charts of FIGS. 10 and 11.

Figure 10:
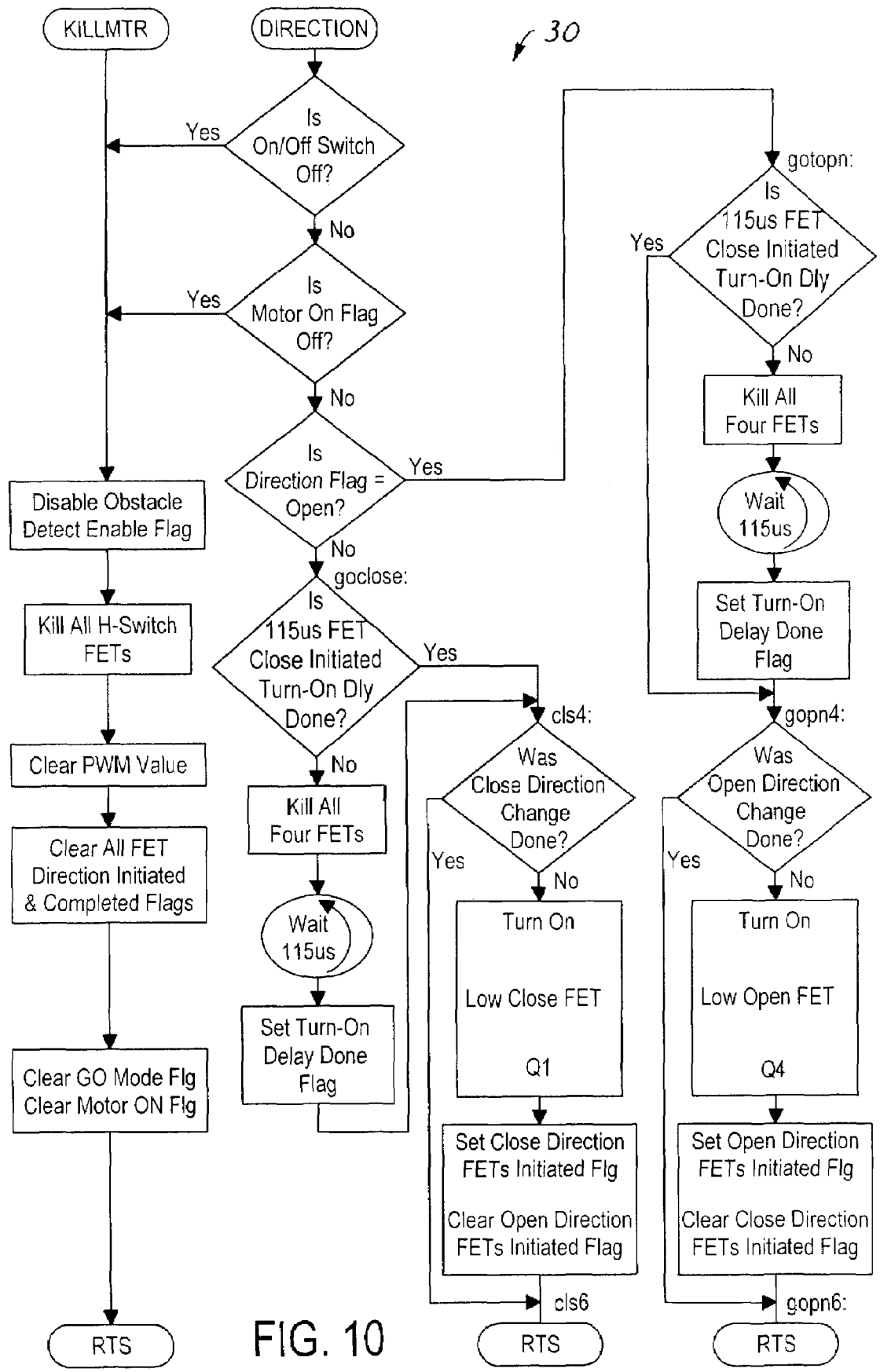
FIG. 10 is a software initialization subroutine flow chart conducted every millisecond for control of direction of the motor.

The initialization direction subroutine in FIG. 10 occurs every millisecond or so to constantly monitor the direction or whether there was a kill motor input. During the initialization routine, the power switch to the system is monitored to be on or off. If off, the kill motor routine is sequenced and all H-switch FETS are killed, i.e. opened. If the power switch and is on and determined to be on, the direction flag is sensed to be either open or closed. If the flag is sensed for the closed direction, during the first initialization of the close direction, the 115 μsec close initiation turn-on delay is indicated not to be done. Hence all four FETs Q1, Q2, Q4 and Q5 are killed, i.e. turned off and the 115 μsec delay is counted out. The close initiated done flag is then set.

After the close initiation turn on delay done flag is set, the software senses if the close direction change is on. The first time through, the answer will be no and thus the low close FET Q1 is then actuated, i.e. turned on. The close direction FETs initiated flag is set and the open direction FETs initiated flag is cleared.

The subroutine is then done and restarted 1–2 milliseconds later. The second time through from the "direction" box, we now go to the 115 μsec delay done box and see that the it was completed which then sends us back to the close direction change done. This question is now answered as a yes and the sub routine is now done a second time. This subroutine is repeated until the direction change is sensed.

When the direction flow is changed to open signal, a similar 115 μsec open initiation delay is initiated the first time through the Go to open cycle. All four FETs are killed, i.e. open which include the low close FET Q1 and the clock ticks off 115 μsec after which the open turn on delay done flag is set. The open direction change is not done the-first time through so that the software then turns on the Low open FET Q4, sets the open direction FETs initiated flag and clears the close direction FETs initiated flag.

The subroutine is then done and restarted 1–2 milliseconds later. The second time through from the "direction" box, we now go to the open direction 115 μsec delay box and see that it was completed which then sends us back to the open direction change done box. This is now answered as a yes and the sub routine is now done a second time. This is also repeated continuously until the direction change is sensed.

If the close direction is again inputted, the close direction initiation again occurs which opens Q4 and closes Q1 and the cycle repeats as described above.

Figure 11:
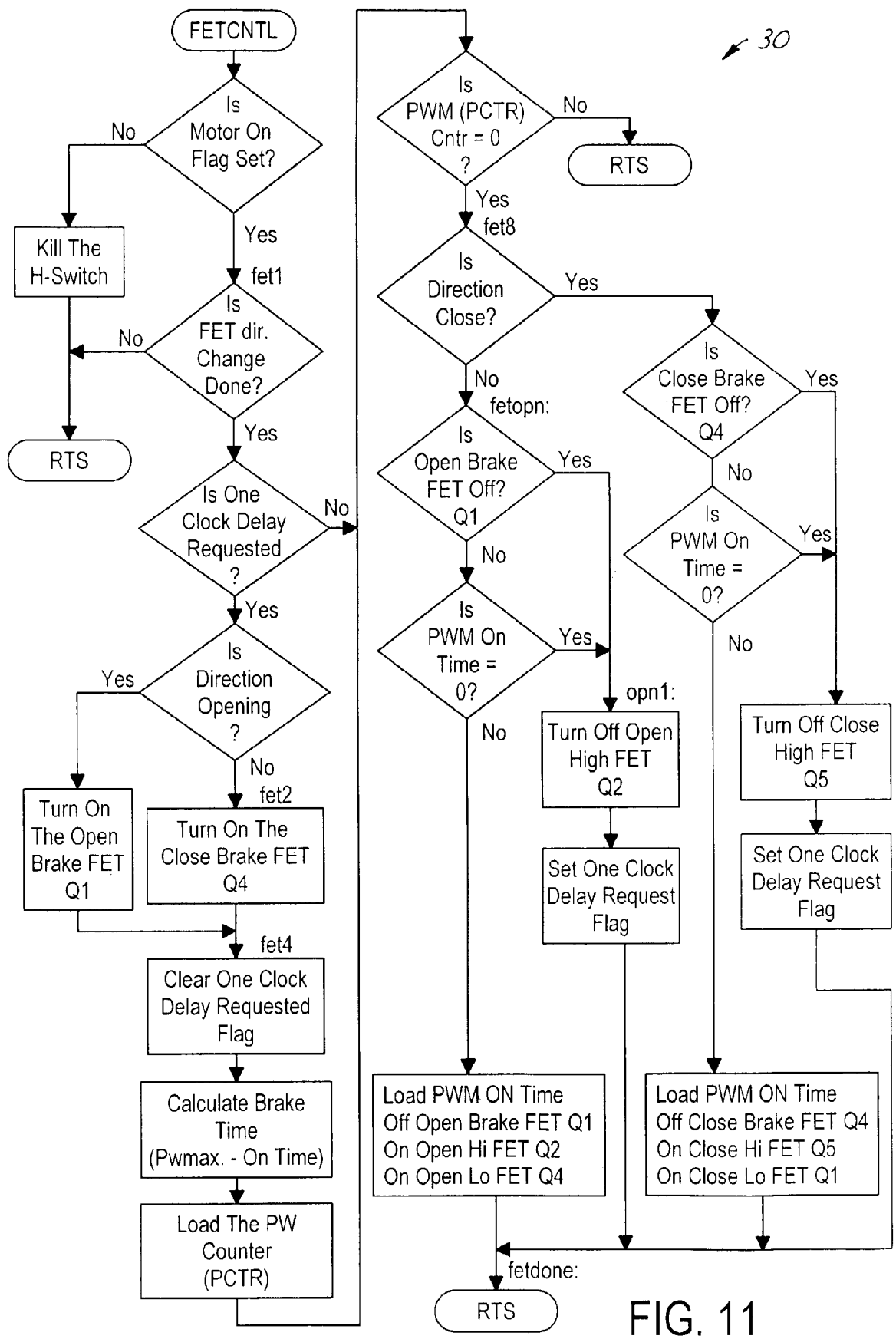
FIG. 11 is a software FET control flow chart conducted every 250 μsec for changing the FET switches.

A FET control subroutine is shown as a flow chart in FIG. 11. In this figure, the subroutine is commenced every tick of the microprocessor clock which can be set at 250 microseconds.

The motor on flag is monitored to be on. This subroutine waits for the FET direction change subroutine to be completed as described above before going any further. When the FET direction change is completed, a clock delay request is monitored. The first time through this subroutine, the answer will be "no" and then the PWM (PCTR) pulse counter is at 0. The subroutine asks which direction. If the direction is in the close direction, the subroutine then asks if the close brake FET is off (Q4). Initially, the close brake FET Q4 will be off so the answer yes directs to turn off the close high FET Q5 (switch is already off) and then a one clock delay flag is set and the subroutine is completed.

After the next clock cycle, (250 μsecs later) the subroutine is initiated again. The second time through, the one clock delay request flag is sensed and so we continue down to if the direction is opening. If we are closing, the answer will be no, and the close brake FET Q4 is turned on. Thus 250 μsec after the Close High FET Q5 is turned off, the close brake FET Q4 is turned on. The one clock delay request flag is cleared and the brake time is calculated for this pulse which loads the PWM counter. The PWM is now not at 0 and the subroutine ends.

The third and subsequent times this subroutine starts, the FET direction change is sensed to be done and the one clock delay requested is set at no and the PWM counter=0 is no. This subroutine is repeated until the PWM counter goes down to 0.

When the PWM counter counts down to 0, the direction is sensed to be closed and the close brake FET Q4 is sensed to be not off. The PWM counter is at 0 and the direction is close. The close brake FET Q4 is not off. The PWM on time is not at 0 because it is at the beginning of the on time pulse. At this time, the PWM on time is loaded onto the PWM counter, the Close brake FET Q4 is switched on, the HI FET Q5 is turned on and the close Lo FET Q1 is also actuated (which is already on).

It is noted that there is no delay at this point when turning off the close brake (Q4) and turning on the close HI FET Q5. The reason is that the close brake de-actuates faster than the HI FET turns on so that no delay is needed. The subroutine is then completed.

The FETCONTROL subroutine restarts and shows that no clock delay is requested and the PWM counter is not at 0. This route is repeated until the counter goes to 0. At 0 again, the close direction is sensed and the close brake FET is sensed to be off. At this point the turn off close HIGH FET Q5 command is given and the one clock delay request flag is set so the needed delay between the deactuation of Q5 and actuation of Q4. The cycle is now complete to repeat between the brake and the power cycle in the close direction until the close cycle ends.

As shown in the flow charts, a similar procedure is done when the open direction is sensed to provide the needed delay when the open HIGH FET Q2 is turned off and before the open brake FET Q1 is turned on. Similarly, no delay is needed when the brake FET Q1 is turned off and the HI FET Q2 is turned on.

When the open direction is indicated, the open brake FET is monitored if off (Q1). Initially, the open brake FET Q4 will be off so the answer yes directs the turns off of the open high FET Q2 (switch is already off) and then a one close delay flag is set and the subroutine is completed.

After the next clock cycle, (250 μsecs later), the subroutine is initiated again. The second time through, the one clock delay request flag is sensed and so we continue down to if the direction is opening. When we are opening, the answer will be yes, and the open brake FET Q1 is turned on. Thus 250 μsecs after the Open High FET Q2 is turned off, the open brake FET Q1 is turned on. The one clock delay request flag is cleared and the brake time is calculated for this pulse which loads the PWM counter. The PWM is now not at 0 the subroutine ends.

The third and subsequent times this subroutine starts, the FET direction change is sensed to be done and the one clock delay requested is set at no and the PWM counter=0 is no. This subroutine route is repeated until the PWM counter goes down to 0.

When the PWM counter counts down to 0, the direction is sensed to be open, i.e. close=No and the open brake FET Q4 is sensed to be not off. The PWM counter is at 0 and the direction is open. The open brake FET Q1 is not off. The PWM on time is not at 0 because it is at the beginning of the on time pulse. At this time, the PWM on time is loaded onto the PWM counter, the open brake FET Q1 is switched on, the HI FET Q2 is turned on and the open Lo FET Q4 is also actuated (which is already on).

It is noted that there is no delay at this point when turning off the open brake (Q1) and turning on the open HI FET Q2. The reason is that the open brake de-actuates faster than the HI FET turns on so that no delay is needed. The subroutine is then completed.

The FETCONTROL subroutine restarts and shows that no clock delay is requested and the PWM counter is not at 0. This route is repeated until the counter goes to 0. At 0 again, the open direction is sensed, i.e. direction close=no, and the open brake FET is sensed to be off. At this point, the turn off open HIGH FET Q2 command is given and the one clock delay request flag is set so the needed delay between the deactuation of Q2 and the actuation of Q1. The cycle is now complete to repeat between the brake and the power cycle in the open direction until the open cycle ends.

It is foreseen that the needed delays can be built into an alternate hardware switching device rather than the above described software controls. It is also foreseen that the delays may be reduced or even eliminated if instantaneous switching is developed.

In this fashion, a pulse width modulated electric motor has dynamic damping and control provided by single pulses of power interdigitated with single pulses of braking through a shorting circuit.

Variations and modifications are possible without departing from the scope and spirit of the present invention as defined by the appended claims.

The invention claimed is:

1. A method of controlling an electric motor that is driven by an H-bridge driver having four switches connected to said motor, wherein the closure of a first high switch and a third low switch power the motor in a forward direction, the closure of a second high switch and fourth low switch power the motor in a reverse direction and the closure of the third low and fourth low switch short circuit the motor for providing a braking current, the method comprising;
   interdigitating single pulses of power to run said motor in either the forward or reverse direction via closure of the appropriate high and low switches with single braking pulses formed by a shorting circuit formed by closure of the third and fourth low switches;
   controlling the length of the single pulses of power with the single braking pulses for dynamically controlling said motor by an algorithm in a microprocessor.

2. A method as defined in claim 1 further comprising:
   said switches being transistors,
   providing a delay device to between the opening of one high switch that determines the end of a power pulse and the closing of a low switch that determines the commencement of the next respective braking pulse such that a low and high switch on the same leg of the H-bridge driver are never both closed at the same time.

3. A method as defined in claim 2 further comprising:
   said delay device being said microprocessor sending open and closing signals to the field effect transistors.

4. A method of controlling the motion of lift gate in an automotive vehicle by an electric motor that is driven by an H-bridge driver having four switches connected to said motor, wherein the closure of a first high switch and a third low switch power the motor in a forward direction, the closure of a second high switch and fourth low switch power the motor in a reverse direction and the closure of the third low and fourth low switch short circuit the motor for providing a braking current, the method comprising;
   interdigitating single pulses of power to run said motor in either the forward or reverse direction by closure of appropriate switches with single braking pulses formed by a shorting circuit formed by closure of the third and fourth low switches;
   controlling the length of the single pulses of power with the single braking pulses for dynamically controlling said motor in either the forward direction to open the lift gate or in the reverse direction to close the lift gate by an algorithm in a microprocessor.

5. A method as defined in claim 4 further comprising:
   said switches being transistors,
   providing a delay device to between the opening of one high switch that determines the end of a power pulse and the closing of a low switch that determines the commencement of the next respective braking pulse such that a low and high switch on the same leg of the H-bridge driver are never both closed at the same time.

6. A method as defined in claim 5 further comprising:
   said delay device being said microprocessor sending open and closing signals to the transistors.

7. A method of dynamically damping a running electric motor, said method comprising:
   interdigitating single pulses of power to run said motor with single braking pulses by repeatedly switching an H-bridge driver via closure of appropriate high and low switches to alternately provide a power circuit through said motor and a shorting circuit through said closed switches that includes said electric motor; and
   controlling the length of the single pulses of power with the single braking pulses for dynamically controlling said motor by an algorithm in a microprocessor.

* * * * *